No. 674,752. Patented May 21, 1901.
C. A. BAKER.
EXTENSIBLE SHADE ROLLER.
(Application filed Oct. 29, 1900.)

(No Model.)

Witnesses:
Fred Gerlach
Alberta Adamick

Inventor:
Chas. A. Baker
By Price & Fisher
Attorneys.

UNITED STATES PATENT OFFICE.

CHARLES A. BAKER, OF WAUKESHA, WISCONSIN, ASSIGNOR TO THE BALL BEARING SHADE ROLLER COMPANY, OF SAME PLACE.

EXTENSIBLE SHADE-ROLLER.

SPECIFICATION forming part of Letters Patent No. 674,752, dated May 21, 1901.

Application filed October 29, 1900. Serial No. 34,754. (No model.)

*To all whom it may concern:*

Be it known that I, CHARLES A. BAKER, a resident of the city and county of Waukesha, in the State of Wisconsin, have invented certain new and useful Improvements in Extensible Shade-Rollers, of which the following is a full, clear, and exact description.

This invention has relation more particularly to that class of shade-rollers in which provision is made whereby the length of the rollers may be varied to suit different widths of shades; and the invention consists in the features of improvement hereinafter described, illustrated in the accompanying drawings, and particularly pointed out in the claims at the end of this specification.

Figure 1:
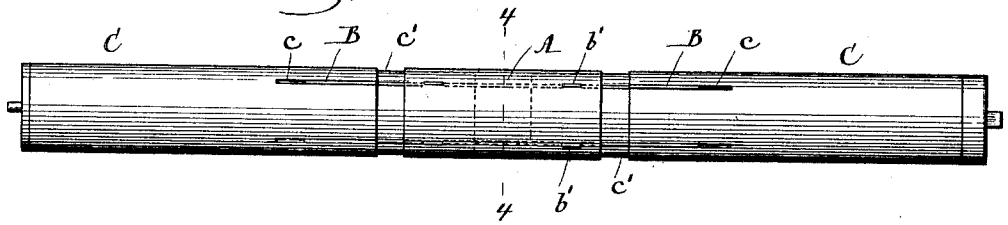
Figure 2:
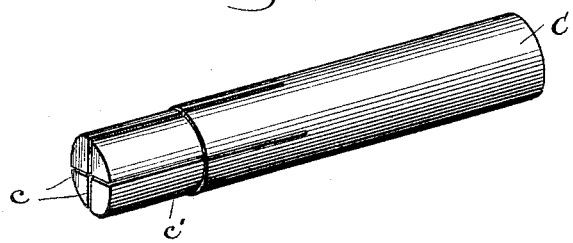
Figure 3:
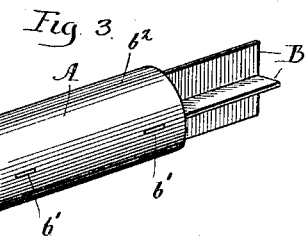
Figure 4:
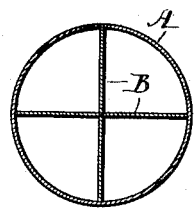
Figure 5:
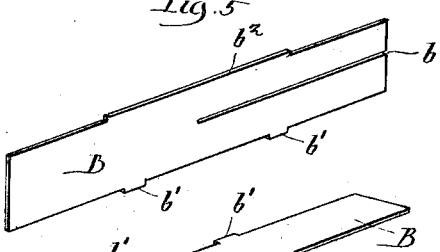
Figure 6:
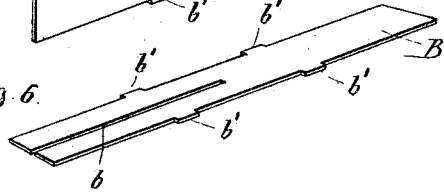

Figure 1 is a view in side elevation of an extensible shade-roller embodying my invention. Fig. 2 is a detail perspective view of one of the end portions of the roller. Fig. 3 is a detail perspective view of the coupling or connector whereby the end sections of the roller will be joined. Fig. 4 is a view in cross-section on line 4 4 of Fig. 1. Figs. 5 and 6 are detail perspective views of the plates or blades of the coupling.

In the manufacture of extensible shade-rollers it has been heretofore proposed to employ a coupling consisting of a sheet-metal plate bent to tubular shape, its edges being brought approximately together and bent inwardly to enter axial slots formed in the periphery of the sections of the roller when the ends of such sections were inserted within said tubular coupling. Such construction, however, has been found objectionable, for the reason that when the wooden sections of the roller had been withdrawn to a considerable extent from the tubular coupling the weight of the sections and the weight of the shade tended to spread the ends of the tubular coupling, thereby permitting the roller to sag at the center. By my present invention provision is made whereby great rigidity shall be given to the roller-sections even when the ends of these sections have been approximately withdrawn from the tubular portion of the coupling.

Preferably the tubular portion A of my improved coupling is formed of sheet metal of cylindrical shape. Beyond one at least and, as shown, preferably beyond both ends of the coupling project suitable brace plates or blades B, that serve to enter the corresponding slotted ends of the sections of the shade-roller to be extensibly connected. As shown, the brace-plates are of cruciform arrangement and are formed of two separate plates, each of these plates being provided with a slot $b$, whereby the plates may be interlocked. Preferably, also, the plates are provided with projecting lugs $b'$, that are adapted to enter slots or holes formed in the tubular portion A of the coupling. So, also, I prefer to form one of the plates B with a laterally-extending edge $b^2$, against which the edges of the tubular portion A will abut and to which such edges will be united by solder or in any other convenient manner. When the blades B have been set together, the solid portion of one blade entering the slot of the other blade, I prefer to run solder along the joints in order to give greater rigidity to the parts.

The projecting portions of the blades or plates are adapted to enter the ends of the wooden sections C of the shade-roller, and for this reason the ends of these sections are formed with cruciform slots $c$, the arrangement of which corresponding with that of the plates or blades B. As shown, the end of each of the sections C is reduced, as at $c'$, to permit such end to enter the tubular portion A of the coupling.

From the foregoing description it will be seen that when the opposing ends of the wooden sections C of the shade-roller are within the coupling the blades or plates that project beyond the ends of the coupling will be embedded within the slotted portions of the ends of the wooden sections and will brace and strengthen such portions of the roller. So, also, it will be observed that even when the wooden sections of the roller are approximately withdrawn from the tubular portion of the coupling the plates or blades B will still brace the ends of the sections, so as to prevent any sagging of the roller at the center and to prevent also any tendency to spread the ends of the tubular part of the coupling.

While I have described what I regard as the preferred form of the invention, it is manifest that the details of construction above set out may be varied widely without departing from the spirit of the invention. So far as I am aware the invention presents the first instance of a shade-roller having a coupling with the tubular portion provided with a brace-plate or part of any kind extending therefrom and adapted to enter the wooden portion of the roller. While four projecting blades are shown at each end of the coupling in cruciform arrangement as the preferred construction, this is not essential, although I prefer that at least two of such projecting blades should be employed and that they should be arranged at an angle with respect to each other, as this arrangement gives greater rigidity to the projecting blades or plates and hence better serves to prevent the sagging of the roller.

Having thus described my invention, what I claim as new, and desire to secure by Letters Patent, is—

1. An extensible shade-roller comprising sections, one of which has a slotted end, and a coupling having a tubular portion to adjustably receive said end, and having a projecting blade or part extending beyond the end of said tubular portion and adapted to enter the slotted end of said section.

2. An extensible shade-roller comprising sections, one of which has a slotted end, and a coupling having a tubular portion to adjustably receive said end, and having plural blades extending beyond the end of said tubular portion and at an angle to each other, said blades being adapted to enter the slotted end of said section.

3. An extensible shade-roller comprising sections, one of which has intersecting slots, and a coupling having a tubular portion, and having intersecting plates or blades to enter said slots of said section.

4. An extensible shade-roller comprising sections, one of which has intersecting slots, and a coupling having a tubular portion, and having intersecting plates or blades projecting beyond the end of said tubular portion and adapted to enter said slots of said section.

5. In an extensible shade-roller, the combination with two wooden roller-sections having their inner ends provided with intersecting slots, of a coupling uniting said roller-sections, comprising an open-ended tube, intersecting plates located within said tube and projecting therefrom so as to enter the slots of said roller-sections.

6. An extensible shade-roller comprising two wooden sections provided with slotted ends, and a coupling for uniting said sections, consisting of a sheet-metal tube and intersecting plates within said tube and adapted to enter the slots of said roller-sections, said plates being united to said tube.

7. An extensible shade-roller comprising sections, one of which has a slotted end, and a coupling comprising an open tube to adjustably receive said end, and a blade within said tube attached to the opposite sides thereof and adapted to enter the slotted end of said section.

8. An extensible shade-roller comprising sections, one of which has a slotted end, and a coupling comprising a cylindrical portion to adjustably receive said end, and having a projecting blade secured to the opposite sides of said cylindrical portion and extending beyond its end, said blade being adapted to enter the slotted end of said section.

CHARLES A. BAKER.

Witnesses:
J. E. DARBY,
A. J. FRAME.